Figure 2:
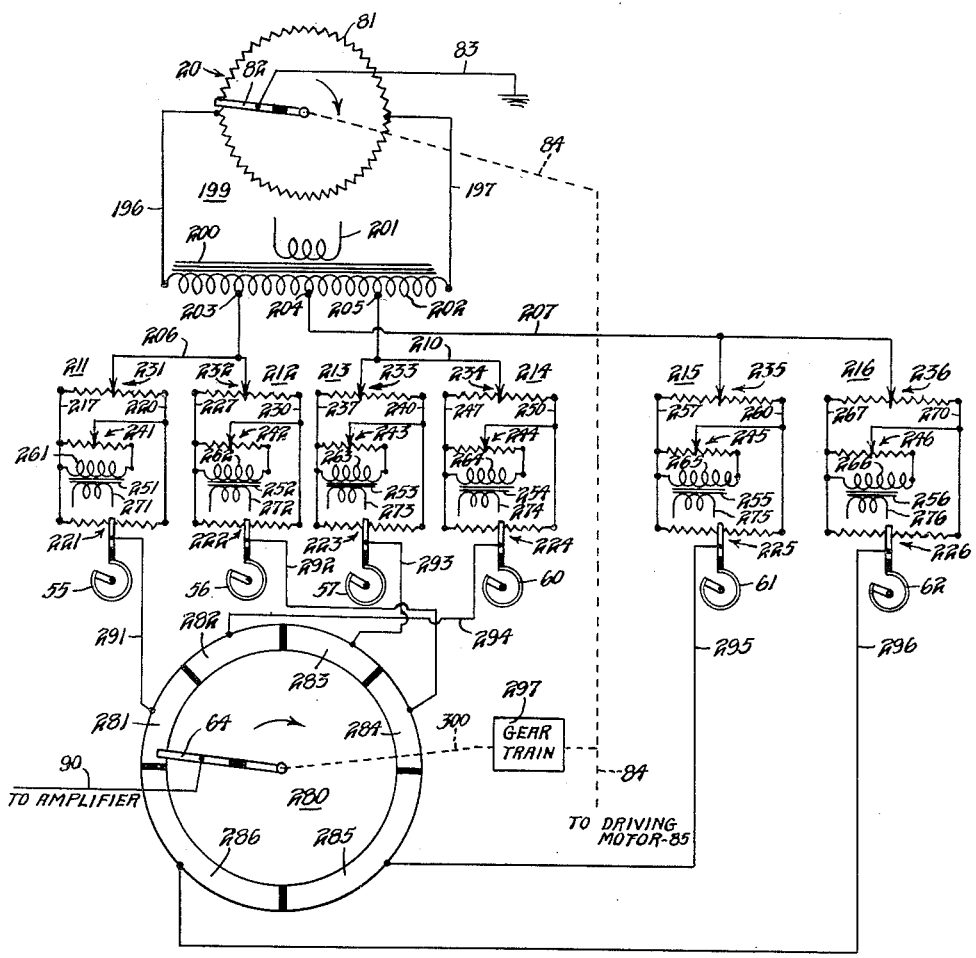

Jan. 13, 1953            R. C. RUHLAND            2,625,458

RECORDING APPARATUS

Filed May 23, 1947                                                 2 SHEETS—SHEET 1

*Fig. 1.*

Inventor
ROMAN C. RUHLAND

*George H. Fisher*
Attorney

Jan. 13, 1953　　　　R. C. RUHLAND　　　　2,625,458
RECORDING APPARATUS
Filed May 23, 1947　　　　　　　　　　　　　　　　2 SHEETS—SHEET 2

Inventor
ROMAN C. RUHLAND

By

George N. Fisher
Attorney

Patented Jan. 13, 1953

2,625,458

UNITED STATES PATENT OFFICE 2,625,458

RECORDING APPARATUS

Roman C. Ruhland, Minneapolis, Minn., assignor to Minneapolis-Honeywell Regulator Company, Minneapolis, Minn., a corporation of Delaware Application May 23, 1947, Serial No. 749,957

17 Claims. (Cl. 346—34)

My invention relates to a multiple channel recorder which has unlimited application and which is especially applicable to use in aircraft for recording on a continuous record a plurality of conditions which are continually changing.

It is known in the art of recording devices to provide such systems with a balanceable network such as a Wheatstone bridge, a potentiometer circuit, or the like. Such systems are limited to a single bridge circuit for recording the variations in a single condition, or a group of bridge circuits each of which are balanced within themselves to record a plurality of conditions. It is an object of this invention to provide a system in which a plurality of potentiometers, whose effective values are varied by sensing elements, are arranged in the form of a network so that they can be connected by means of a switching element to a balancing potentiometer to form a plurality of electrically connected but individually balanceable bridge circuits.

It is also an object of this invention to provide a system comprising a plurality of bridges which can be balanced by the same balancing potentiometer.

A further object of this invention is to provide a system which will give instantaneous recordings of a plurality of fast changing magnitudes.

A still further object of this invention is to provide a system in which the spacing of the recorded values on a single record sheet is divided into separate channels by virtue of the electrical values of the impedances of each of the bridges, without specific mechanical means to so position them.

Another object of this invention is to provide a network on which the records of some of the bridges are spaced in separate channels across the width of the record and the records of other of the bridges in the network are superimposed upon the former records and expanded and centered with respect to the former records.

It is further an object of this invention to provide an amplifier and relay apparatus which is operative on receipt of signals from an associated network in such a manner that one of the relays of said amplifier and relay apparatus operates when a signal of a particular phase is impressed upon the amplifier and the other relay of said amplifier and relay apparatus operates when a signal of the opposite sense is impressed upon the amplifier, but both remain energized during the period when the phase of the signal changes, as indicated by the balance point for the network, due to time delay means which are incorporated in each of the relays.

It is also an object of this invention to provide a system which is small and compact and in which the accuracy and the reliability of the system is high.

Another object of this invention is provided in the system in which the speed of rotation of the rotating parts is reduced with respect to the rate of recording, thereby reducing the wear and possibility of failure of the moving parts.

Various other objects, advantages and features of novelty which characterize my invention are pointed out with particularity in the claims annexed hereto and forming a part hereof. However, for a better understanding of the invention, its advantages, and objects attained by its use, reference should be had to the subjoined drawing, which forms a further part hereof and to the accompanying descriptive matter, in which I have illustrated and described certain preferred embodiments of my invention.

Figure 1 shows diagrammatically a preferred embodiment of a recording system according to the invention together with an appertaining recording device. This system is shown for convenience as comprising six potentiometer sensing units, but it is to be understood that such a system is not limited to such a number.

Figure 2 represents the circuit diagram of another embodiment of the recording system in which the number of potentiometers shown are merely a matter of convenience. This particular embodiment shows a system in which the records of part of the system can be superimposed on the records of the other bridges and these first named records can be entered and expanded by varying the voltage supplied to each bridge.

The recording apparatus shown in Figure 1 is a multiple channel flight recorder which will give continuous record of the variations in a plurality of conditions encountered during flight. This apparatus comprises a network unit 10, an amplifier 21 and relay unit 22, and a recording unit 24 which are energized from a common source 11. The plurality of branches or potentiometer legs 12—17 of network unit 10 are connected in parallel with one another and also in parallel with a balancing variable impedance 20. As the balancing variable impedance 20 is continuously varied, it will sweep through during each revolution a balance point for each of the potentiometer legs 12—17 or branches of the network unit 10. The output of the network unit is impressed upon the amplifier 21 which in turn operates the relay unit 22. The relay unit 22 controls an inductive device energized from the D. C. source 23 to supply an electrical impulse to the recording unit 24 as the output of these network branches or legs 12—17 are sequentially applied, as will later be described, to the amplifier unit 21. The recording unit 24 operates to record each of these balanced conditions of a continuously moving chart record in a manner which becomes apparent as the disclosure proceeds.

Network unit

The network unit 10, as disclosed in Figure 1, is a compound impedance network comprising a plurality of parallel impedance or potentiometer legs 12-17 which are connected in parallel with a balancing variable impedance 20. Potentiometer legs 12—17 are connected by means of common conductors 34—35 to balancing variable impedance 20. The network is energized from a common source of power 11 through transformer 27 whose secondary winding 31 is connected by means of conductors 32, 33 to potentiometer legs 12—17. Primary winding 30 of transformer 27 is energized from source 11 through conductors 25, 26. Each potentiometer or impedance leg 12—17 comprises fixed and variable resistances, as will be further described as the disclosure proceeds, connected in series with one another across the common conductors 34, 35. The variable resistances or potentiometers of these legs include fixed resistances and movable or wiping contacts which are operated by and insulated from sensing elements 55—57, 60—62. For simplicity, the sensing elements are shown in Figure 1 as coiled bimetallic strips. The sensing elements are attached to the frame of the apparatus at the extremity opposite the contact bearing end in a manner to effect movement of the wiping contact along said potentiometers upon variation in temperature or other conditions affecting said sensing elements. The contacts of the variable resistances or potentiometers are connected, as will be noted below, to a switching unit 63.

Switching unit 63 comprises stationary contacts 65—70, 70—72 and rotary wiping contact 64 which is driven by and insulated from shaft 84 of motor 85. Stationary contacts or elements 65—70, 70—72 form an annular shaped stationary contact structure whose individual contacts or elements are separated from one another by pieces of insulating material. Each contact or element is in the form of approximately a 60° segment. Wiping contact 64 is pivoted from the center of this annular structure where it is mounted on shaft 84 and contacts each of said elements as the shaft is rotated. The number of stationary elements of switch 63 is directly related to the number of potentiometer legs in network 10 which are to be balanced by the balancing variable impedance 20. The rotating contact or wiper 64 is connected to balancing variable impedance 20 through amplifier 21 to complete the output circuits from potentiometer legs 12—17 to the balancing impedance 20 in a manner which will become evident.

The balancing variable impedance 20 comprises an annular shaped potentiometer 81 whose resistance winding is continuous. Conductors 34, 35 are tapped to said winding at two taps spaced 180° apart. Variable impedance 20 also includes a wiper 82 which is driven by and insulated from shaft 84 of motor 85. Wiper 82 is connected to ground conductor 83 for the purpose of completing the output circuits of the network as referred to above.

In the network shown in Figure 1, six potentiometer legs or branches for a network were used merely for simplicity in disclosure. The number of potentiometer legs required in such a network is governed, theoretically, only by the number of conditions whose variations it is desired to separately record. The physical size of the balancing variable impedance 20 as well as its ohmic value, the number of stationary contacts of rotary switch 63 and the values of the fixed and variable resistances as well as their positioning with respect to one another in the potentiometer legs are all dependent upon the number of sensing elements or network branches used. Each potentiometer leg is effectively a variable resistance or potentiometer in which the movable portion or wiping contact is restricted to movement over a limited extent of that leg. The use of the fixed resistors merely facilitates the positioning of the variable resistance or the variable portion of the potentiometer leg along the extent of the potentiometer leg so that it can be made to correspond with a similar portion of the balancing variable impedance. Each leg then contains but one variable resistor or potentiometer from which a connection is made to a stationary element of the rotary switch. With the present network of six potentiometer branches or legs it is evident that each leg must be balanced within a definite 60° sector of the balancing variable impedance winding 81 in order that all the network branches or legs 12—17 be balanced in a single revolution of balancing variable impedance wiper 82. In accomplishing this, the variable resistance of each potentiometer leg must be spaced within the potentiometer leg in a position which corresponded with the 60° sector of the balancing variable impedance winding 81 in which it was to be balanced and also must correspond with the positioning of the stationary contact of the rotary switch, as will be later noted. Thus in potentiometer leg 12 comprising fixed resistor 36 and potentiometer 37, the fixed resistance is twice as large as the variable resistance, and the variable resistance 37 is connected directly to common conductor 35. The sector of the balancing variable impedance winding 81 which corresponds with this leg 12 is the 60° sector from the tapped connection to common conductor 35 extending clockwise in the direction of the rotation of the wiper 82. The voltage drop across the fixed resistance of the potentiometer leg 12 and across the remaining 120° portion of the balancing impedance winding 81 will be approximately equal and, depending upon the position of the wiper of potentiometer 37, a point of equal voltage to that contacted by said wiper will be contacted by wiper 82 of the balancing variable impedance 20 as the wiper 82 rotates through this 60° sector. Such a condition is also true of the corresponding 60° portion of the balancing variable impedance winding 81 positioned counterclockwise from common conductor 35, but because of the positioning of the stationary switch contact which corresponds with the potentiometer leg 12, the output circuit for potentiometer leg 12 and balancing variable impedance 20 will be made only when this particular switch circuit is made, as will be later described.

In a similar manner, the fixed resistors 40 and 42 are each equal in ohmic value to the variable resistor 41 of potentiometer leg 13. Variable resistor or potentiometer 41 is placed in series between the two fixed resistors 40 and 42 so that the center portion of potentiometer leg 13 is variable. The corresponding portion of the balancing variable impedance 20 within which potentiometer leg 13 can be balanced is that 60° sector located half way between common conductors 34 and 35. Since the movable contact or wiper of potentiometer 41 is connected to the stationary switch contact 66 which corresponds to this position for clockwise rotation, the second 60° sector of winding 81 located clockwise from the tapped connection of conductor 35 is the portion within which this potentiometer leg 13 will be balanced.

The potentiometer leg 14, which is similar in structure to leg 12, contains a fixed resistance 44 which is twice the ohmic value of the variable resistance 43. Variable resistance or potentiometer 43 is located along the extremity of potentiometer leg 14 and connected directly to common conductor 34. In the manner described above, the corresponding portion of the balancing variable impedance winding 81 which corresponds or contains points of equal potential with that of the variable resistance or potentiometer 43 is the 60° sector nearest the common conductor 34. The wiping contact of potentiometer 43 is connected to the stationary contact 67 of rotary switch 63 which contact is located so that it is contacted and swept through during the time that wiper 82 is passing through this third 60° sector of impedance winding 81.

In a similar manner the potentiometer legs 15, 16 and 17, comprise fixed resistors and variable resistors or potentiometers of such values and with potentiometers placed within the extremities of potentiometer legs in such position that each leg can be balanced within a definite 60° sector of the balancing variable impedance winding 81. Potentiometer leg 15 is identical in construction to potentiometer leg 14. In the same manner, potentiometer legs 16 and 13 and potentiometer legs 17 and 12 are similar in construction. The wiping contacts of the potentiometers in each of the respective legs are connected to stationary switch contacts which correspond in position to the respective sectors of the balancing variable impedance winding 81 within which each of these potentiometer legs can be balanced. Thus potentiometer leg 15 corresponds with the fourth 60° sector of impedance winding 81, potentiometer leg 16 corresponds with the fifth 60° sector of impedance winding 81, and potentiometer leg 17 corresponds with the sixth 60° sector of impedance winding 81 as the wiper 82 of the balancing variable impedance 20 rotates clockwise on the second half of the impedance winding 81.

The output circuits for each of the potentiometer legs 12—17 comprise the connection between the wiping contact of the potentiometer in each leg and its respective stationary contact of rotary switch 63, the connection between the rotary contact 64 of switch 63 and the amplifier 21, and the ground connection between amplifier 21 and the wiping contact 82 of the balancing variable impedance 20. Effectively, each of the potentiometer legs 12—17 form a Wheatstone bridge circuit with the balancing variable impedance, and the circuits between the wipers of the potentiometers of each leg and the balancing variable impedance 20 comprise the output diagonal of each bridge. Potentiometer 37 of potentiometer leg or branch 12 of the network 10 is connected from its wiping contact by means of conductor 73 to the stationary contact 65 of rotary switch 63. The rotary contact 64 of switch 63 is connected by means of conductor 90 through an input resistor of amplifier 21 to be further described, to a ground connection. Grounded conductor 83 of the wiper 82 of the balancing variable impedance 20 completes this output circuit. Similar connections by means of conductors 74—77 and 80 exist between the potentiometers 41, 43, 45, 50 and 53 of potentiometer legs or branches 13—17, respectively, and the stationary switch contacts 66—67 and 70—72 of the rotary switch 63. The connection from the rotary contact 64 of switch 63 through the amplifier to wiper 82 of the balancing variable impedance 20 is common to all output circuits.

Motor 85 which drives the wiper 82 of balancing variable impedance 20 and the rotating contact 64 of rotary switch 63 by means of shaft 84 is continuously operated at a uniform speed being energized from the main source 11 through two conductors 193, 194. Control switch 195, schematically shown in conductor 193, provides a means of stopping and starting said motor. The motor 85 also provides motivating power for operating recorder 24, as will be further described as the disclosure proceeds.

The rotating elements of the balancing variable impedance 20 and the rotating switch 63, in the present arrangement, are mounted on shaft 84 in the same angular position and rotate in a clockwise direction at the same speed, each completing one revolution and returning to the starting point in the same period of time. In this manner, output circuits are provided from all of the potentiometers of the branches or potentiometer legs 12—17 to the balancing variable impedance 20 (in sequence). The size or length of each stationary contact of switch 63 is such that it approaches a 60° sector. Similar to a 60° sector of the balancing variable impedance winding 81 and hence the output circuit is established and maintained during the period in which the wiper 82 of balancing variable impedance 20 sweeps through the 60° sector of winding 81 within which the respective potentiometer legs can be balanced.

Referring to Figure 1, and assuming the positions of the respective rotating elements as shown, it is seen that potentiometer leg 12 is being balanced by balancing variable impedance 20. As the rotating contact 64 of switch 63 makes contact with the stationary contact 65, the output circuit between potentiometer 37 and balancing variable impedance 20 is established, as follows: contact of potentiometer 37, conductor 73, stationary contact 65, rotating contact 64, conductor 90, input resistor 87 of amplifier 21, ground connection 88 of amplifier 21, grounded conductor 83 of balancing variable impedance 20, to wiper 82 of impedance 20. At the same time, wiper 82 will start rotating through the 60° sector of winding 81 which contains points of equal potential to that existing in potentiometer 37. Assuming that the wiper of potentiometer 37 is positioned somewhere near the center of its resistor element, an immediate potential appears across the output circuit. This potential or voltage across the output circuit decreases to zero as wiper 82 reaches a point of equal potential with that of the wiper of potentiometer 37 and increases to a maximum again with an opposite phase relationship or direction of polarity as wiper 82 sweeps past that balance point. When the rotating contact 64 reaches a point where the next stationary contact 66 is being contacted, the output circuit of potentiometer leg 13 is established. At this time, wiper 82 of balancing impedance 20 is sweeping through the second 60° sector of the impedance winding 81 which corresponds with the potentiometer leg 13. The same operation occurs continuously as the rotating contact 64 of switch 63 and wiper 82 of balancing variable impedance 20 rotate in synchronism. As conditions which operate the sensing elements 55—57, 60—62 vary, the balance points of each of the respective potentiometer legs or branches 12—17 vary along the periphery of the impedance winding 81 but remain within their respective sectors. The effect on the output circuits of these potentials which vary in magnitude and shift in phase as they are sequentially applied to the amplifier and relay unit will become evident as the disclosure proceeds.

*Amplifier and relay unit*

The amplifier and relay unit comprises a conventional amplifier 21 with two stages of amplification 86, 106 and a pair of discriminator tubes 122, 123 which control the energization of a pair of relays 22 from a control transformer 143. The relays 22 control the energization of an inductive device or sparking transformer 170 from a D. C. battery source 23. The output from such transformer provides a surge in potential to mark the record which is being driven by the recording unit 24.

The first stage of amplification or amplifier tube 86 is controlled by the voltage impressed on the input resistor 87, said grid biasing resistor being located in the output circuits of the network 10 as described above. Conductor 90 connecting the rotary switch 63 to the grid biasing resistor 87 extends to grid 91 of tube 86 to complete the biasing circuit. Cathode 92 of tube 86 is biased by an unby-passed resistor 93 which is grounded by conductor 94. Plate or anode 95 or tube 86 is connected through conductor 96 and output resistor 97 to a D. C. source 102. Conductor 96 also connects anode 95 to coupling condenser 104 which couples said anode or plate to the grid input resistor 111 of tube 106. Grid input resistor 111 is connected to grid 107 of tube 106 by conductor 110 which also serves to connect said grid to the coupling condenser 104 and is grounded through grounded conductor 112. Cathode 115 of amplifier tube 106 is biased by the by-passed biasing resistor 117 which is grounded by conductor 120. Condenser 116, connected in parallel with biasing resistor 117, serves as the by-pass. Anode 113 of amplifier tube 106 is similarly connected to the D. C. source 102 through an output resistor 105 which is connected to said anode by a conductor 114. D. C. source 102 is in turn filtered by a condenser 100 which is grounded by a conductor 101. Coupling condenser 121, connected to anode 113 by conductor 114, couples said anode or plate with grids 126, 127 of discriminator tubes 122—123. Grids 126, 127 are connected to grid input resistor 130 by conductor 125, input resistor 130 being grounded to ground conductor 128. Cathodes 131 and 132 of discriminator tubes 122—123 are biased by by-passed resistor 134 which is connected to said cathodes by conductor 133. Cathode biasing resistor 134 is by-passed by by-pass condenser 135, connected in parallel with it, and is grounded by conductor 136. Anodes or plates 137, 140 of discriminator tubes 122—123 respectively are connected to the opposite ends of secondary windings 145—146 of a transformer 43 so that said anodes do not have the same polarity impressed on them at the same time and hence are not conductive at the same time. Transformer 143 which serves to supply power to operate a pair of relays 22, includes primary winding 144 energized from the main alternating source 11 through conductors 25, 26 (not shown as connected in the drawing) and the before mentioned secondary windings 145, 146. The opposite end of each secondary winding 145, 146 which is not connected to the plates of the discriminator tubes 122, 123, are connected by means of conductors 151, 152 to the energizing coils of the relay coils 147, 150 of the pair of relays 22. These relays operate independently although their operating contacts are connected in series connection and the ends of the coils, not connected to said transformer secondaries 145, 146, are connected by means of common conductor 153 to the ground conductor 154. Connected in parallel with relay coils 147, 150 are condensers 155, 157, respectively. One end of each condenser is connected directly to its associated relay coil. The opposite ends are connected to the relay coils through ground conductors 156, 160 respectively and ground conductor 154. Condensers 155, 157 serve to provide a time delay action in the decay in potential applied to one or the other of relay coils 147, 150 when its respective secondary energizing winding of control transformer 143 is deenergized by an opening of a circuit, to be later described, by one or the other of the discriminator tubes 122, 123.

The pair of relays 22, when the operating contacts of each are closed, control the energization of the primary winding 171 of sparking transformer 170 from the D. C. or battery source 23. The negative terminal of battery 23 is grounded by conductor 174 and the positive terminal is connected to one end of the primary winding 171. Primary winding 171 is connected at its opposite extremity by means of conductor 166 to the movable contact 163 of the relay actuated by coil 147. Stationary contact 161 of this relay, which cooperates with the movable contact 163 is connected to the stationary contact 162 of the relay whose coil 150 operates its respective movable contact 164. Movable contact 164 is connected to ground conductor 165 to complete the energizing circuit of the transformer primary winding through the relay contacts to ground. Condenser 167, connected between conductor 166 and ground conductor 173, serves to provide a means of arresting arcing across the contacts of relays 22 which might occur after current flow through the primary winding 171 has been established by the making of the contacts of both relays 22 and the circuit is again reopened. An inductive surge occurs in the primary of transformer 170 when said primary is energized from the battery 23 as follows: positive terminal of battery 23, primary winding 171, conductor 166, relay contacts 163, 161 and 162, 164, and ground conductor 165 to ground conductor 174 of battery 23. This surge impresses momentarily a high potential upon secondary 172 of transformer 170 to energize a circuit for the recording apparatus 24, which will be later described.

Current flow in the output circuits of the network 19 and through the input resistor 87 of the first stage of amplification of amplifier 21 causes a voltage drop to occur across said resistor which is applied to grid 91 by reason of the following circuit: from cathode 92, through ground conductor 94 and ground conductor 68, and resistor 87 to grid 91. The amplified A. C. component of the voltage impressed on grid 91 will be impressed on resistor 97 and establish a voltage drop across the grid biasing resistor 111 of tube 106. Tube 106 is similar to tube 86 and functions in the same manner. The A. C. component of the output of tube 106 is impressed across grid input resistor 130 of discriminator tubes 122, 123 to impress on the grids 126, 127 the same potential at the same time. The anodes 137, 140 of discriminator tubes 122, 123, respectively, have applied thereto voltages opposite in phase since they are connected to extremities of the secondary windings 145, 146 of control transformer 143 which are opposite in phase and the cathodes are connected together. One or the other of said discriminator tubes 122, 123 will be conductive depending upon the phase relation between the bridge output and the voltage energizing the transformer 143. Thus as the phase of the input voltage to the grid biasing resistor 87 of tube 86 reverses, the phase of the output of network 19 reverses—that is at the time when the balance point for one of its branches is reached—one of the discriminator tubes will stop conducting and the other will start conducting. Relay coils 147, 150 which are controlled by said discriminator tubes 122, 123 are independently energized through transformer secondaries 145, 146 by circuits which prevent energization of the said relay coils at the same time. Coil 147 is energized through a circuit as follows: secondary winding 145 of transformer 143, conductor 141, anode 137 of tube 122, cathode 131, conductor 133, resistor 134 and by-pass condenser 135, ground conductor 136, ground conductor 154, conductor 153, coil 147, conductor 151 to secondary winding 145. Coil 150 is similarly energized through a circuit as follows: secondary winding 146 of transformer 143, conductor 142, anode 140 of discriminator tube 123, cathode 132, conductor 133, resistor 134 and by-pass condenser 135, ground conductor 136, ground conductor 154, conductor 153, coil 150, conductor 152 to secondary winding 146. Since each of the time delay condensers 155, 157 has one plate grounded to ground conductors 156, 160 respectively, a parallel circuit is established around each relay coil 147, 150 respectively, and a time delay in the drop out of each relay occurs when its energizing main circuit is broken. Thus when the energizing circuit for one relay coil is broken and circuit for the other coil is made, the first named coil will remain energized momentarily because the charge built up on its respective condenser which is connected in parallel with the relay coil will be impressed upon said coil while the condenser discharges through it. During this interval, both relay coils will be energized and their contacts closed, thereby providing a circuit for energizing the sparking transformer 170, as described above. The momentary current flow from the D. C. source 23 through the primary winding 171 of sparking transformer 170 builds up a voltage in the secondary winding 172 which is sufficiently large to record on the recording unit 24.

*Recording unit*

Recording unit 24 is comprised of styli apparatus 180 and chart drive assembly 181, both of which are positioned by the driving motor 85. Chart drive assembly 181 includes a driving roller 182, free roller 183, recording sheet 188, geared shaft 184 attached to the driving roller 182, a second geared shaft 185 directly attached to motor 85 and belt drive pulleys 186. Styli apparatus 180 includes belt 192, styli 191 attached to belt 192, ground plate 187, grounded conductor 193, brush and holder 189, conductor 177, and resistor 176.

Motor 85 drives the driving roller 182 through a geared connection between geared shaft 184 and geared shaft 185, said first named shaft being fixed to the driving roller. The chart record 188, or the unmarked portion of which is stored on free roller 183 is fed from the free roller 183 through an opening or space between belt 192 and the ground plate 187 to the driving roller 182 where the marked portion of said record is stored. Simultaneously the motor 85 drives one of the belt pulleys 186 which is keyed to shaft 185. Belt 192, which is made of an electrical conductive material, has the styli 191 attached to it and is mounted on the belt pulleys 186. The diameter of the pulleys 186, the length of the belt 192 and the number of the styli 191 attached to belt 192 are all factors which are dependent on one another. In order to record continuously all of the balanced conditions for each of the branches or legs 12—17 of network 19, a stylus 191 must cross the chart record 188 with each revolution of the rotary switch 63 and balancing variable impedance 20. This is the time required to balance all of the network branches. It follows that the spacing of the styli 191 on belt 192 is equal to the distance of the width of the chart record 188 or the distance that the belt 192 travels within one revolution of the belt pulley 186.

In the present arrangement, as shown in Figure 1, the length of the belt 192 is equal to four times the width of the chart record 188, and the four styli 192 are spaced a distance apart equal to the width of the chart record 188. Belt pulleys 186 are such diameter that their circumference is equal to the spacing between the styli 192, thereby insuring movement of the styli the width of the chart record 188 during each revolution of the belt pulleys 186 or the driving motor 85. Belt 192 is also positioned on pulleys 186 so that one of the styli 191 is located at the edge of the chart 188 ready to start movement across the width of said record as wiper arm 82 of balancing variable impedance 20 and rotary switch contact 64 of rotary switch 63 are in position to start across a given sixty degree sector of winding 81 and the stationary contact 65, respectively. This insures proper spacing of the records into channels of equal width and further facilitates identifying each of the records with its respective circuit. This use of a plurality of styli 191 on belt 192 presents an advantageous arrangement in permitting the recording, continuously, of the effects of a plurality of networks which are connected sequentially to a recording apparatus. Not only can the spacing of the records be obtained, but the marking apparatus or styli is always in position to record on the record sheet and no loss of time or skipping of operations of the networks occurs. Such an arrangement presents a definite advantage over the common type of recording apparatus where either the marking apparatus or the record sheet has to be repositioned before a new sequence of operation can take place.

*Operation of Figure 1*

The operation of the subject recording apparatus can best be described by assuming the positions of the movable elements as shown in Figure 1. Rotary contact 64 of switch 63 is starting to make contact with the stationary contact 65. Wiper 82 of balancing variable impedance 20 is starting to sweep through the 60° sector of winding 81 after passing the tap to conductor 35. One of the styli 191 is just starting across the record 188. Wiping contact of potentiometer 37 positioned in potentiometer leg or branch 12 to which the stationary contact 65 is connected, is positioned by sensing element 55 somewhere along the resistor of said potentiometer. While all of the potentiometer legs 12–17 of the network 10 as well as the balancing variable impedance 20 are energized from source 11, the slider of only potentiometer leg 12 is connected to the balancing impedance 20. Effectively a Wheatstone bridge circuit is obtained between potentiometer leg 12 and balancing variable impedance 20 whose input is supplied by conductors 32, 33 from transformer secondary 31 and whose output circuit, as described above, is established with the making of contact between rotary contact 64 and stationary contact 65 of switch 63.

Motor 85, continuously energized from source 11, drives simultaneously the rotary elements of the balancing variable impedance and the rotary switch, the driving chart roller 182 and the styli apparatus. Immediately upon establishment of the output circuit for potentiometer leg 12, a voltage or signal will be impressed upon the amplifier through input resistor 37 since the wiper 82 is in contact with a point on impedance winding 81 whose potential differs from the potential existing at the contact point of the wiper of potentiometer 37. Depending upon the sense or phase of this signal, one or the other of the discriminator tubes 122, 123 will become conductive and establish an energizing circuit for its respective relay coil. Since only one relay is energized, the energizing circuit of the sparking transformer 170 is not completed and no output from said transformer occurs to mark the record. As the rotating elements, wiper 82 and contact 64 and belt 192, continue to move, a point on the impedance winding 81 is contacted which is of the same potential as that of the contact of potentiometer 37 and a balance condition occurs at which time no current or signal flows in the output circuit. The output of amplifier 21 is then momentarily cut off but since time delay condensers 155, 157 are connected in parallel with each of the relay coils 147, 150, the coil whose energization was previously controlled by amplifier 21 continues to remain energized as said condenser discharges. Wiper 82, as it sweeps around the impedance winding 81 remains in contact with so called "balance point" only instantaneously and immediately upon passing this point, the phase or sense of the output potential changes and its magnitude increases in value. This change in phase causes the discriminator tube, heretofore inoperative, to become conductive and permit the energization of the relay. Momentarily while the first named time delay condenser discharges, both relay coils 147, 150 are energized and their contacts make to establish an energizing circuit for sparking transformer 170. As soon as the condenser discharges, its respective relay coil becomes deenergized and its operating contacts open breaking this energizing circuit. The output of the secondary winding 172 of transformer 170 is impressed upon the styli apparatus 180 in the following circuit: transformer secondary 172, resistor 176, conductor 177, brush and holder 189, belt 192, styli 191, ground plate 187, ground conductor 190, to grounded tap 175 of transformer secondary 172. The high potential obtained from transformer 170 bridges the gap between one of the styli 191 which is then passing above the ground plate 187, and the ground plate 187 burning a record mark of the balance point on the record 188. The network unit, as disclosed above, is not, however, limited in its use to recording apparatus. Such a unit could be readily adapted to perform any desired controlling function by simply using its output to control through itself or any other intermediate devices.

After the balance point is passed and until the next stationary contact segment is reached, no further change takes place in the amplifier and relay unit. The spacing between the stationary relay contacts 65—67 and 70—72 provides sufficient time interval between the change from one output circuit to another to prohibit both relays from being made again as the phase of the output changes. As the rotary elements sweep across the next stationary contact 66 and its similarly positioned portion of the winding 81 corresponding to potentiometer leg 13, the same operation occurs. The records for each network branch or leg 12—17 are thus kept within a definite channel or spacing on the chart record 188 as governed by the distance that a stylus moves while the rotary contact is in contact with the stationary elements of the rotary switch. In the present apparatus six such channels will occur. Variations in conditions which operate the sensing elements 55—57 and 60—62 shift the positions of the respective wipers on each of the potentiometers and hence the balance point for each network branch or leg, but the records indicating this shift are contained within the limits of the above named channels.

It is evident from the foregoing description that the amplifier does not permit energization of the sparking transformer at the instant the balance condition for each bridge of the network occurs. Not until after this balance condition is passed and an unbalanced condition occurs are the styli energized by a potential from the sparking transformer to mark the chart record. This time interval which occurs between the balance condition of the bridge and the marking of the chart record is constant because the energizing voltage and the speed of the rotating parts are constant. Thus while the individual record mark is not made at the time the bridge is balanced and hence not at the time when the wiper 82 of the balancing potentiometer is positioned on a point of the winding 81 which corresponds to the instantaneous value of the condition, the same amount of offset occurs on the chart record for each recording and the variation in values which occur are truly represented. In this respect, the relay and inductive device is operated as an incident to each network being balanced. In calibrating the recording unit, a zero or normal value correction can be made by shifting the datum line on the recording chart when a calibrated chart record is used. This will make the recording mark correspond with the value of the condition present during the balancing of its respective bridge network. Since such calibration of recording devices is common practice this operation was not included in the disclosure.

*Figure 2*

The modification of the recording apparatus, as shown in Figure 2, discloses another embodiment of the network unit which operates through the amplifier 21 and relay unit 22 to record continuous variations of a plurality of conditions on the recording unit 24. For simplicity in disclosure and discussion, only the network is shown but it is understood that it will be used with the amplifier, relay and recording units of Figure 1.

The network unit as shown in Figure 2, comprises a plurality of bridges 211—216 the output circuits of which are connected sequentially in series with the output circuit of a balancing bridge 199 and the effect of said combined circuits is impressed upon the amplifier 21 and relay units 22 in the same manner as disclosed in Figure 1. The output of each of the bridges 211—216 is individually balanced by the output of the balancing bridge 199 connected in series with it so that the signal to the amplifier is null when the balancing bridge has an output which is equal to and opposite in sense to the output of said bridge. As such a condition is occurring in the manner described above, the amplifier and relay unit operate to control the energization of an inductive device 178 and the potential thus obtained marks the record 188 of recording unit 24 to record such balance points.

Bridges 211—216 comprise centering potentiometers 231—236, ratio potentiometers 241—246, energizing transformers 251—256, sensing potentiometers 221—226, and sensing elements 55—57 and 60—62. In bridge 211, centering potentiometer 231, whose manually adjusted wiper is connected to balancing bridge 199 in a manner to be further described, is connected in parallel with sensing potentiometer 221 by conductors 217 and 220 to form said bridge. Bridge 211 is energized by transformer 251 whose primary winding 271 is energized from the common source 11 (not shown) and whose secondary 261 is connected to the opposite terminals of the resistor of ratio potentiometer 241. One extremity of ratio potentiometer 241 is attached to one side of said bridge at conductor 217 and its wiping contact is connected to the opposite side of the bridge at conductor 220. Sensing element 55, shown in Figure 2 as a coiled bimetallic strip, actuates the contact of sensing potentiometer 221 and is insulated from it. The contact of potentiometer 221 which is actuated by sensing element 55 is connected to the stationary element or contact 231 of switch 280 by conductor 291 for purposes which will become evident as the disclosure proceeds. Bridges 212—216 are similar in construction and function to bridge 211, described above, in the following manner. Bridge 212 comprises centering potentiometer 232 and sensing potentiometer 222 connected in parallel by conductors 227 and 230. Energizing transformer 252 comprises primary winding 272 energized from source 11 and secondary winding 262 connected to the opposite terminals of the resistor of ratio potentiometer 242. The output terminals of ratio potentiometer 242 are connected in parallel with the above named potentiometers, one extremity being connected to conductor 227 and the contact of said potentiometer being connected to conductor 230. Bridge 213 comprises centering potentiometer 233 and sensing potentiometer 223 connected in parallel by conductors 237 and 240. Energizing transformer 253 of bridge 213 comprises primary winding 273 energized from common source 11 and secondary winding 263 connected to the opposite terminals of the resistor of ratio potentiometer 243. The output terminals of ratio potentiometers 243 are connected in parallel with the above named potentiometers, one extremity being connected to conductor 227 and the contact of said potentiometers connected to conductor 230. Bridge 214 comprises centering potentiometer 234 and sensing potentiometer 224 connected in parallel by conductors 247 and 250. Energizing transformer 254 of bridge 214 comprises primary winding 274 energized from common source 11 and secondary winding 264 connected to the opposite terminals of the resistor of ratio potentiometer 244. The output terminals of ratio potentiometer 244 are connected in parallel with the above named potentiometers, one extremity being connected to conductor 247 and the contact of said ratio potentiometer being connected to conductor 250. Energizing transformers 251—254 of bridges 211—214 have a secondary output potential which is equal to that of transformer 269 of balancing bridge 199. Due to the positioning of the wiping contact ratio potentiometers 241—244 of said bridges, their energizing potential is equal to approximately one-half of the energizing voltage of balancing bridge 199.

Bridge 215 comprises centering potentiometer 235 and sensing potentiometer 225 connected in parallel by conductors 257 and 260. Energizing transformer 255 of bridge 215 comprises primary winding 275 energized from common source 11 and secondary winding 265 connected to the opposite terminals of the resistor of ratio potentiometer 245. The output terminals of ratio potentiometer 245 are connected in parallel with the above named potentiometers, one extremity being connected to conductor 257 and the wiping contact of said ratio potentiometer being connected to conductor 260. Bridge 216 comprises centering potentiometer 236 and sensing potentiometer 226 connected in parallel by conductors 267 and 270. Energizing transformer 256 of bridge 216 comprises primary winding 276 energized from common source 11 and secondary winding 266 connected to the opposite terminals of the resistor of ratio potentiometer 246. The output terminals of ratio potentiometer 246 are connected in parallel with the above named potentiometers, one extremity being connected to conductor 267 and the wiping contact of said ratio potentiometer being connected to conductor 270. Energizing transformers 255, 256 have a secondary output of twice the voltage of transformer 269 of balancing bridge 199 and transformers 251—254 of bridges 211—214. Due to the positioning of the wiping contacts of the respective ratio potentiometers 245—246, the energizing voltages of said bridges are equal to the energizing voltage of rebalancing bridge 199. The sensing elements 56—57, 60—62 are similar in construction and function to sensing element 55 each being respectively connected to and insulated from the wiping contacts of sensing potentiometers 222—226. The contacts of said sensing potentiometers are connected to the stationary elements 282—286 of switch 280 in the following order. Contact of potentiometer 222 is connected by means of conductor 292 to stationary switch element 284. Contact of sensing potentiometer 223 is connected by means of conductor 293 to stationary switch contact 283. Contact of sensing potentiometer 224 is connected by means of conductor 294 to stationary switch element 282. Contact of sensing potentiometer 225 is connected by means of conductor 295 to stationary switch element 285. Contact of sensing potentiometer 226 is connected by means of conductor 296 to stationary switch element 286.

The stationary elements 281—286 of rotary switch 280 which were recited above form an annular shaped stationary contact structure whose individual contacts or elements are separated from one another by pieces of insulating material. Pivoted from the center of said ring is a rotary wiping contact 64 which is driven by shaft 300 through gear train 297. The gear train 297 is driven from the shaft 84 of motor 85, the gear reduction being two to one. Wiping portion of contact 64 is insulated through the main portion of the contact arm and hence is insulated from the driving shaft and gear train. Conductor 99 connects the rotary contact arm 64 with amplifier 21 through grid input resistor 87 in a manner previously described.

The output circuits for the bridges 211—216 extend from the wiping contacts of their respective sensing potentiometers to the stationary elements of the switch 280, to the wiping contact of said switch and through conductor 90 to the grid input resistor 87 of amplifier 21. The other extremity of the circuits extends from the wiping contact of the respective centering potentiometers of bridges 211—216 to the tapped connection of the secondary winding 202 of transformer 200 which forms a part of the balancing bridge 199. These connections with the above named transformer taps are effective to connect the output circuits of the respective bridges with the output circuit of the balancing bridge to complete the circuit through the amplifier 21 in a manner which will become evident as the disclosure proceeds.

Balancing bridge 199 comprises the balancing variable impedance 20 and energizing transformer 200 connected in series by conductors 196 and 197. Balancing variable impedance 20 includes annular resistor winding 81 which is connected to conductors 196, 197 by two taps spaced 180° apart, and wiping contact 82 driven by and insulated from shaft 84 of motor 85 (not shown). Wiper 82 is grounded by conductor 83 to complete the output circuit to amplifier 21, that is, the circuit through grounded conductor 83 to grounded conductor 88 of biasing resistor 87 in the first stage of amplification of amplifier 21. The primary winding 201 of energizing transformer 200 is energized from common source 11 by connections not shown in the drawing. Secondary winding 202 of transformer 200 which is connected at its extremities to conductors 196, 197 includes tapped connections 203, 204 and 205, the purposes of which will become apparent as the disclosure proceeds. Bridges 211—216 are connected in series with balancing bridge 199 at the above named tapped connections in the following manner. The wiping contacts of centering potentiometers 231 and 232 of bridges 211 and 212 respectively are connected by common conductor 206 to tap 203. The wiping contacts of centering potentiometers 233 and 234 of bridges 213 and 214, respectively, are connected by common conductor 210 to tap 205. The contacts of centering potentiometers 235 and 236 of bridges 215 and 216, respectively, are connected through common conductor 207 to tapped connection 204. Secondary winding 202 of transformer 200 in bridge 199 is so constructed with different taps 203—205 that the positions of the impedance wiper 82 of balancing variable impedance 20 for the balance point of said bridge are located at different points about the impedance winding 81 for each tap. Thus, considering a connection to the balancing bridge 199 at tap 203, it will be noted that under the balance conditions for the balancing bridge only, the wiper 82 will be located at winding 81 at a point one-quarter of the distance along said winding from tapped connection of conductor 196. Similarly the position of wiper 82 when the balancing bridge 199 for taps 204 and 205 will be located on the winding 81 at points one-half the length of winding 81 between conductor taps 196—197 and three-quarters of the length of winding 81 from the conductor tap 196 respectively. Similar points would be found on the other half of impedance winding 81.

The input voltage to all transformers in the network are the same since all are energized from the common source 11 (not shown in Figure 2). The secondary windings 202 and 261—264 have the same potential output. Bridges 211—214, however, which are supplied by transformers 251—254, have just one-half of the potential applied to them as compared with bridge 199 since the secondary windings 261—264 of said transformers are connected to the ratio potentiometers 241—246 which act as voltage dividers, their respective wipers being approximately centered. Transformers 255—256, while having the same applied potential to their respective primary windings 275—276, have an increased output from the secondary windings 265—266 which is twice as large as the secondary output of the before mentioned transformers. These secondary windings, however, energize ratio potentiometers 245—246 which act as voltage dividers in energizing the bridges 215—216 and due to the positioning of the wiping contacts of said ratio potentiometers, the voltages applied to these bridges are approximately one-half of the transformer outputs or a voltage which is equal to the energizing voltage of the balancing bridge 199. While the position of the wiping contacts of potentiometers 241—246 is generally set at a point midway between the extremities of its respective potentiometer winding, as noted above, said contacts are manually adjustable to decrease or increase the voltage applied to their respective bridges. A change in this applied voltage changes the unbalance voltage of the bridge for a given movement of the sensing element and requires increased or decreased movement of the balancing variable impedance wiper 82 to balance the new unbalanced voltage for the same condition. This effectively expands or contracts the scale of the recording instrument with respect to the value of the condition being reported.

For practical purposes, the wipers of the centering potentiometers 231—236 of bridges 211—216 are fixed at the centers of their respective potentiometer windings so that the maximum of unbalance voltage which can be obtained from these bridges is equal to one-half of its applied or energizing voltage. The centering potentiometer provides a means of manually adjusting the relation between centering potentiometer and sensing potentiometer for normal position of the sensing elements 55—57 and 60—62 so that the output of said bridge will be zero under the normal conditions and the balance point of the combination of bridge and balancing bridge will occur at the balance point of the balancing bridge.

Bridges 211—214 whose applied potential is one-half the potential applied to balancing bridge 192 and whose maximum unbalance is one-half of that applied potential or one-fourth of the applied potential to balancing bridge 199, as noted above, are connected to the balancing bridge 199 by circuits previously recited to taps 203 and 205. These taps are at points on the transformer secondary winding 202 which possess a potential of one-quarter the applied potential of the balancing bridge. The balance points on impedance winding 81 which correspond to said taps are located at points along the winding 81 at one-fourth of the distance between conductors 196 and 197. With the maximum unbalance of bridges connected in series with the balancing bridge equal to one-quarter of the total applied voltage to the balancing bridge 199, the balancing variable impedance 20 can balance such signal or unbalance from the bridges by movement over one-fourth of the distance along the winding 81 between the conductor taps 196 and 197 in either direction from said balance point which corresponds to the respective taps.

A relative movement between the wiper 82 of balancing impedance 20 and the rotary switch contact 64 of rotary switch 280 as previously noted was in the ratio of two to one or two revolutions of wiper 82 to a single revolution of the contact 64. Assuming the positions of these respective elements as shown in Figure 2, the rotary switch contact 64 will establish contact with the stationary contacts 281—284 and complete the output circuits for the network with bridges 211—214 in a sequence noted below as the wiper 82 of balancing impedance 20 moves through 360° or a single revolution. During the period when the switch contact 64 is in contact with one of these stationary elements, the wiper 82 will move through a 90° sector along the impedance winding 81. Since the balance point of balancing bridge is located midway along this sector of movement of the wiper 82, there is sufficient range on either side of the normal balance point to rebalance the maximum unbalance of the bridge connected in series with the balancing bridge at that period. In this manner, somewhere within the first 90° sector of balancing impedance winding 81, wiper 82 will reach a point where the output of the balancing bridge 199 is equal to and opposite in phase to the output of bridge 211 and no signal will appear in the combined output of this circuit to the amplifier 21. Similarly when the output circuit is established through bridge 214 by contact of the rotary contact 64 with the stationary element 282, wiper 82 will be sweeping through the second 90° sector of winding 81 and the same operation will occur. As the rotating contact 64 makes contact with the stationary element 283, bridge 213 will be connected in series with the balancing bridge 199 and the combined output of the two bridges will be impressed upon the amplifier 21 as wiper 82 sweeps at the third 90° sector of impedance winding 81. The same operation occurs when the rotary contact 64 makes contact with the stationary element 284 and bridge 212 is connected in series with balancing bridge 199. It is to be noted that the sequence in which the bridges 211—214 are connected to the balancing bridge is dependent on the connection of the individual bridge to the transformer taps 203—205 of the balancing bridge 199 since the wiper 82 of the balancing variable impedance 20 must be operating on the section of winding 81 which corresponds with the tap connection with which said bridge is connected.

Bridge 215 and bridge 216 will be connected sequentially in series with the balancing bridge 199 with the second revolution of wiper 82 of balancing impedance 20 and the second half of revolution of rotary switch contact 64 of switch 280. Since the balance point of balancing bridge 199 corresponding to tap 204 of secondary winding 202 is located midway between the conductor taps 196, 197 on impedance winding 81 and since the maximum unbalance voltage of the bridges 215 and 216 is approximately one-half of the voltage applied to said bridges and the balancing bridge 199, it follows that the positioning of wiper 82, 90° away from the mid-point of the winding 81 between conductor taps 196, 197 will balance a maximum unbalance condition. Movement of the wiper 82 on the winding 81 from the tap of conductor 196 to the tap of conductor 197 balances bridge 215 during the period when rotary contact 64 is contacting stationary element 285 of switch 280. During the second half revolution of wiper 82, the same operation occurs during which the bridge 216 is balanced.

The operation of the recording unit 24, amplifier 21 and relay 22 unit with the present network is the same as that described for the network embodiment of Figure 1. The styli apparatus 180 (not shown) moves at the same speed as shaft 84 and hence the belt pulleys 186 complete two revolutions during the period in which all bridges 211—216 are balanced. During the first revolution when one stylus moves across the record sheet 188, bridges 211—214 are balanced by balancing bridge 199 and these balance points are recorded within four channels corresponding to the sectors of the impedance winding 81 within which the network is balanced or during the periods in which the output circuit for each of the bridge combinations are made through the rotary switch. During the second revolution of the wiper 82 on winding 81 of balancing impedance 20, when the next stylus moves across the record sheet 188, bridges 215—216 are balanced by balancing bridge 199 and the record of their balance points are superimposed on the records of the first named bridges each being limited within a channel corresponding to the periods during which their respective output circuits are completed of the balancing bridge 199 to the amplifier 21 or limited to one-half of the chart record.

Amplifier 21, as previously described, has the same type of varying voltage or signal applied to it from the present network as each output circuit is established, and the relays 22 do not operate the inductive device to record the balance point until this output or signal decreases to zero and then appears again in an opposite sense indicating that a balance condition has just been passed as described above. The recording unit then operates as heretofore described.

Numerous objects and advantages of my invention have been set forth in the foregoing description, together with details of the structure and function of the invention, and the novel features thereof are pointed out in the appended claims. The disclosure, however, is illustrative only and I may make changes in detail within the principles of the invention, to the full extent indicated by the broad general meaning of the terms in which the appended claims are expressed.

I claim:

1. Electrical apparatus for recording a plurality of variable conditions, comprising in combination, a plurality of variable voltage means each of which is variable within predetermined limits in response to variable conditions, the limits of one being non-overlapping in respect to each other, a uniformly variable voltage producing means variable over range which includes the summation of the individual limits of said first named voltage producing means, continuously operated motor means, switching means driven by said motor means, amplifier means including discriminator means, means including said switching means for sequentially connecting said last named voltage producing means through said amplifier means to each of said first named voltage producing means to provide a plurality of balanceable networks the output circuits of which include said amplifier means, said output circuits of each of said networks having impressed thereon an unbalanced voltage which varies in phase and magnitude, relay means including a pair of relays each having associated time delay means, inductive means, recording means, one of said relays of said relay means being operative when a voltage of a given phase occurs in said output circuits of said networks, the other of said relays being operative when a voltage of an opposite phase occurs in said output circuits of said networks, and means including said time delay means energizing both of said relays as said voltage in the output circuit of said network changes sense, said inductive means operating to record on said recording means as both of said relays are energized.

2. Electrical apparatus for recording a plurality of variable conditions, comprising in combination, a plurality of variable impedance means, means energizing each of said variable impedance means from a source of power, certain of said impedance means being variable within predetermined limits in response to variable conditions, the limits of each of said condition responsive impedance means being non-overlapping in respect to each other, means for varying one of said impedance means at a uniform rate over a range which includes the summation of the limits of said first named impedance means, continuously operated motor means, switching means driven by said motor means, amplifier means including discriminator means, means including said switching means for sequentially connecting said last named impedance means through said amplifier means to said first named impedance means to provide a plurality of balanceable networks the output circuits of which include said amplifier means, said networks each being balanced within predetermined values of said impedance varying at uniform rate, relay means including a pair of relays each having associated time delay means, and energized from said amplifier means, said relay means being energized independently of one another depending upon the phase of the voltage energizing said amplifier means, inductive means, recorder means, said inductive means being operative upon energization of both of said relays to record on said recording means, and means including said time delay means energizing both of said relays upon change in phase of said voltage as an incident to each network passing through its balanced condition.

3. In a device of the class described, a plurality of voltage producing circuits each including fixed and variable electrical impedances, each of said variable impedances being variable in response to a predetermined condition, a balancing voltage circuit including a single variable impedance, electrical connection means connecting said plurality of said voltage producing circuits and said balancing circuit together such that all of the circuits have the same potential drop occurring therein, output connections connected to each of said variable impedances of said plurality of voltage producing circuits at points of differing electrical potential, switching means having a plurality of stationary contacts and a movable contact, said output connections being connected to said stationary contacts of said switching means, a variable position connection connected to said impedance of said balancing circuit and adapted to be varied cyclically through a predetermined range of operation, amplifier means connected to said movable contact of said switching means and said variable connection of said balancing circuit to complete an electrical circuit therethrough, means operating said switching means and said variably positioned connection of said balancing circuit simultaneously to move said movable contact relative to said stationary contacts and said variably positioned connection relative to said impedance to connect said output connections to said variable connection of said balancing circuit when said variable connection is approaching a potential point substantially equal in amount to the potential existing at said respective output connection, said amplifier means being sequentially operative as said variable connection reaches a point of potential equal to each of the potentials of said output connection.

4. In a device of the class described, a plurality of sensing circuits each including a fixed resistor and a potentiometer having a wiper, means connecting said sensing circuits together in a parallel arrangement and adapting said plurality of circuits to be simultaneously energized from a source of power, condition responsive means attached to said wipers of said potentiometers for actuating the same in response to a predetermined condition, a balancing circuit including a circular continuous potentiometer adapted to be continuously energized from said source of power, a rotary wiper for said circular potentiometer adapted to be driven continuously along the extent of said potentiometer, a rotary switching device including a plurality of stationary contacts and a movable contact, means connecting said wipers of said sensing circuits to said stationary contacts of said switching means, further means connecting said movable contact of said switching device to said wiper of said circular potentiometer, motor means for operating said rotary switching device and said wiper of said circular potentiometer to connect each of said wipers of said plurality of sensing circuits to said balancing circuit sequentially and at varying positions along the extent of said balancing potentiometer, and means including in said further means responding to a condition determined by the passing of said wiper on said circular potentiometer over a position of electrical potential on said potentiometer equal to the potential existing at the respective wipers of the potentiometers of said sensing circuits then connecting to said balancing circuit.

5. In a device of the class described, in combination, a plurality of sensing circuits each including variable impedances having adjustable connections thereto, means connecting said sensing circuits together in a parallel relationship and adapting them to be energized simultaneously from a source of power, condition responsive means attached to said adjustable connections of said variable impedances for actuating the same in response to predetermined conditions for varying said impedances, a balancing circuit including a circular potentiometer adapted to be continuously energized from said source of power, a rotary wiper for said circular potentiometer adapted to be driven continuously along the extent of said potentiometer, a switching device including a plurality of stationary contacts and a movable contact, means connecting said wipers of said sensing circuits to said stationary contact of said switching means, further means connecting said movable contact of said switching device and said wiper of said circular potentiometer, motor means for operating said switching device and said wiper of said circular potentiometer to connect each of said adjustable connections of said plurality of sensing circuits to said balancing circuit sequentially at varying positions along the extent of said balancing potentiometer, and means included in said further means responding to a condition determined by the passing of said wiper of said circular potentiometer or by position of electrical potential on said potentiometer equal to the potential existing at the respective adjustable connections of said variable impedances of said sensing circuits then connected to said balancing circuit.

6. In a device of the class described, comprising, a plurality of sensing circuits each including potentiometers having adjustable wipers thereon, means connecting said plurality of sensing circuits together and adapting them to be energized simultaneously from a source of power, condition responsive means attached to said adjustable wipers of said potentiometers for actuating the same in response to predetermined conditions, a balancing circuit including a circular potentiometer adapted to be continuously energized from a source of power, a rotary wiper for said circuit and potentiometer adapted to be driven continuously along the extent of said potentiometer, a switching device including a plurality of stationary contacts and a movable contact, means connecting said wipers of said sensing circuits to said stationary contact of said switching means, further means connecting said movable contact of said switching device to said wiper of said circular potentiometer, means including a motor means for operating said switching device and said wiper of said circular potentiometer to connect more than one of said wipers of said plurality of said sensing circuits to said balancing circuit sequentially and at varying positions along the extent of said balancing potentiometer during a single travel of said wiper along the extent thereof, and exhibitor means included in said further means responding to a condition determined by the passing of said wiper of said circular potentiometer over a position of electrical potential on said potentiometer equal to the potential existing at the respective wipers of said potentiometers of said sensing circuits then connected to said balancing circuit.

7. In a device of the class described, comprising, a plurality of sensing circuits each including a variable impedance means having an adjustable connection thereto, means connecting said sensing circuits together and adapting them to be energized simultaneously from a common source of power, condition responsive means attached to each of the adjustable connections of said variable impedances for actuating the same in response to predetermined conditions, a balancing circuit including a circular potentiometer adapted to be continuously energized from said source of power, a wiper for said circular potentiometer adapted to be moved continuously along the extent of said potentiometer, a rotary switching device including a plurality of stationary contacts and a movable contact, means connecting said adjustable connections of said sensing circuits to said stationary contacts of said switching means, further means connecting said movable contact of said switching device to said wiper of said circular potentiometer, motor means for operating said rotary switching device and said wiper of said circular potentiometer to connect more than one of said adjustable connections of said plurality of sensing circuits to said balancing circuit sequentially in a single travel of said wiper over said circular potentiometer and at varying positions along the extent of said circuit of the potentiometer, and exhibitor means included in said further means responding to a condition determined by the passing of said wiper of said circular potentiometer over a position of electrical potential on said potentiometer equal to the electrical potential existing at the respective adjustable connections of said variable impedances of said sensing circuits then connected to said balancing circuit.

8. In a device of the class described, a plurality of sensing bridge circuits each including a pair of adjustable potentiometers, condition responsive means attached to one potentiometer of each of said bridge circuits for actuating the same in response to a predetermined condition, means connecting said plurality of bridge circuits together and adapting them to be energized simultaneously from a source of power, and a balancing circuit including a circular continuous potentiometer adapted to be continuously energized from said source of power, a rotary for said circular potentiometer adapted to be driven continuously along the extent of said potentiometer, a rotary switching device including a plurality of stationary contacts and movable contact, means connecting one of said potentiometers of each of said sensing bridge circuits to said stationary contacts of said switching device, further means connecting said movable contact of said switching device to said wiper of said circular potentiometer, motor means for operating said rotary switching device and said wiper of said circular potentiometer to connect more than one of said potentiometers of said plurality of sensing bridge circuits to said balancing circuit sequentially and at varying positions along the extent of said balancing potentiometer, and means included in said further means responding to the condition determined by the passing of the wiper of said circular potentiometer over a position of electrical potential on said potentiometer equal to an electrical potential existing at the respective connections of said potentiometers of said sensing circuits connected to said stationary contacts then connected to the balancing circuit.

9. In a device of the class described, comprising, a plurality of sensing circuits each including a variable impedance means having an adjustable connection thereto, means connecting said sensing circuits together and adapting them to be energized simultaneously from a common source of power, condition responsive means attached to each of the adjustable connections of said variable impedances for actuating the same in response to predetermined conditions, a balancing circuit including a circular potentiometer adapted to be continuously energized from said source of power, a wiper for said circular potentiometer adapted to be moved continuously along the extent of said potentiometer, a rotary switching device including a plurality of stationary contacts and a movable contact, means connecting said adjustable connections of said sensing circuits to said stationary contacts of said switching means, further means connecting said movable contact of said switching device to said wiper of said circular potentiometer, motor means for operating said rotary switching device and said wiper of said circular potentiometer to connect more than one of said adjustable connections of said plurality of sensing circuits to said balancing circuit sequentially in a single travel of said wiper over said circular potentiometer and at varying positions along the extent of said circuit of potentiometer, and means included in said further means responding to a condition determined by the passing of said wiper of said circular potentiometer over a position of electrical potential on said potentiometer equal to the electrical potential existing at the respective adjustable connections of said variable impedances of said sensing circuits then connected to said balancing circuit, recording means including a continuous belt with two or more marking elements mounted thereon and a chart record, means including said motor means for driving said belt and said chart record, said belt moving transversely of the movement of said chart record over a predetermined limited distance as each of said sensing circuits is connected to said balancing circuit to define a channel on said chart record for each sensing circuit which channels do not overlap with respect to one another, one of said marking elements moving relative to said chart record during each switching operation of said switching device, and means for marking said chart record operated by said means included in said further means as it responds to the condition of equal potential in said sensing and balancing circuits.

10. In a device of the class described, in combination, a plurality of sensing circuits each including a potentiometer having a wiper, condition responsive means attached to said wipers for actuating the same in response to a predetermined condition, means connecting said sensing circuits together in a parallel relationship and adapting them to be energized from a source of power, a balancing circuit including a circular potentiometer adapted to be continuously energized from said source of power, a rotary wiper for said circular potentiometer adapted to be driven continuously along the extent of said potentiometer, a switching device including a plurality of stationary contacts and a movable contact, means connecting said wipers of said potentiometers of said sensing circuits to said stationary contacts of said switching means and said movable contact of said switching device to said wiper of said circular potentiometer to form a plurality of output circuits the outputs of which vary in magnitude and sense, motor means for operating said switching device and said wiper of said circular potentiometer to connect each of said wipers of said potentiometers of said plurality of said sensing circuits to said balancing circuit sequentially and at varying positions along the extent of said balancing potentiometer, relay means included in said second named connecting means having a pair of relays with associated time delay means, said relays being independently operated by said output circuits depending upon the magnitude and sense of output of each of said circuits, means including said time delay means for causing one of said relays to remain operative as the other relay becomes operative upon a change in magnitude and sense in the output of said output circuits, and means controlled by the operation of both of said relays.

11. In a device of the class described, in combination, a plurality of sensing circuits each including variable impedances having adjustable connections thereto, means connecting said sensing circuits together in a parellel relationship and adapting them to be energized simultaneously from a source of power, condition responsive means attached to said adjustable connections of said sensing circuits for actuating them in response to a predetermined condition, a balancing circuit including a potentiometer adapted to be continuously energized from said source of power, a wiper for said potentiometer adapted to be moved continuously along the extent of said potentiometer, a switching device including a plurality of stationary contacts and a movable contact, means connecting said adjustable connections of said sensing circuits to said stationary contacts of said switching device and said movable contact of said switching device to said wiper of said balancing potentiometer to form a plurality of output circuits the outputs of which vary in magnitude and sense, motor means for operating said movable contact of said switching device and said wiper of said balancing potentiometer to connect said adjustable connections of said plurality of sensing circuits to said balancing circuit sequentially and at varying positions along the extent of said balancing potentiometer, relay means including a pair of relays having associated time delay means forming a part of said second named connecting means, said relay means being independently operated by said output circuit means depending upon the magnitude and sense of the output of said output circuits, means including said time delay means causing one of said relays to remain operative as the other relay becomes operative upon a change in magnitude and sense of output of each of said output circuits, and means controlled by the operation of both of said relays to cause an indication of this change in magnitude and sense in the output of said output circuits.

12. In a device of the class described, in combination, a plurality of sensing bridges each including a pair of potentiometers connected in a parallel relationship with one of said potentiometers being operated by a condition responsive means in response to a predetermined condition, means for energizing each of said bridge circuits including a potential dividing means connected across said bridge circuits, a balancing circuit including a circular potentiometer and a transformer having a tapped secondary winding connected to said circular potentiometer for energizing the same, a wiper for said circular potentiometer continuously rotated in contact therewith throughout the full extent of said potentiometer, means connecting pairs of said bridge circuits at one of said potentiometers thereof to said taps of said secondary winding of said transformer, a rotary switching device having a plurality of stationary contacts and a movable contact to associate it therewith, means connecting said bridge circuits at the other of said potentiometers to said stationary contacts, further means connecting said wiper of said circular potentiometer and said movable contact of said switching device to complete a plurality of output circuits between said bridge circuits and said balancing circuit, the outputs of which vary in magnitude and sense, motor means actuating said movable contact and said wiper of said circular potentiometer to connect more than one of said output circuits during a single travel of said wiper along the extent of said circular potentiometer, and means included in said further means becoming operative when the output of each of said output circuits changes in magnitude and sense.

13. In a device of the class described, in combination, a plurality of sensing circuits each including a potentiometer having an adjustable wiper, condition responsive means attached to said wipers for actuating the same in response to predetermined conditions, a balancing circuit including a circular potentiometer adapted to be continuously energized from a source of power, means connecting said plurality of sensing circuits together and to said balancing circuit, a rotary wiper for said circular potentiometer adapted to be driven continuously along the extent of the same, a rotary switching device including a plurality of stationary contacts and a movable contact, means connecting said wipers of said sensing circuits to said stationary contacts of said switching device, further means connecting said movable contact of said switching device and said wiper of said circular potentiometer, motor means for operating said rotary switching device and said wiper of said circuit potentiometer to connect each of said wipers of said plurality of sensing circuits to said balancing circuit sequentially at varied positions along the extent of said balancing potentiometer, means included in said further means responding to a condition determined by the passing of said wiper of said circuit potentiometer over a position of the electrical potential on said potentiometer equal to the potential existing at the respective wipers of the potentiometers of the sensing circuits then connected to said balancing circuit, and additional potentiometer means connected to said sensing circuits for varying the voltage applied to the same.

14. Electrical apparatus of the class described comprising in combination, circuit means having an output which varies in magnitude and phase, relay means including a pair of relays each having associated time delay means connected thereto, means including a pair of discriminating means connected to said circuit means and said relay means and selectively operative in response to the output of said circuit means depending upon the phase of said output for controlling the operation of one or the other of said relays, means including said time delay means causing one of said relays to remain operative while its associated discriminating means becomes inoperative and as the other relay becomes operative upon operation of its associated discriminating means on a change in phase of said output of said circuit means, and means controlled by the simultaneous operation of both of said relays.

15. Electrical apparatus of the class described comprising in combination, circuit means having an output which varies in magnitude and phase, relay means including a pair of relays each having associated time delay means connected thereto, means including a pair of discriminating means connected to such circuit means and said relay means and selectively operative in response to the output of said circuit means depending upon the phase of said output for controlling the operation of one or the other of said relays, means including said time delay means causing one of said relays to remain operative while its associated discriminating means becomes inoperative and as the other relay becomes operative upon operation of its associated discriminating means on a change in phase of said output of said circuit means, contact means included in each of said relays and connected in a series relationship, and means connected to said series contacts of said relays and controlled by the simultaneous operation of both of said relays to cause an indication of this change in phase in the output of said circuit means.

16. In a device of the class described, comprising in combination, circuit means having a plurality of combinations each of which has a separate output which varies in phase, relay means including a pair of relays each of which includes associated time delay means connected thereto, a pair of discriminating means connected respectively to said pair of relays, switching means sequentially connecting said circuit means to said pair of discriminating means in a plurality of different connections such that said plurality of combinations of said circuit means having different outputs are connected respectively to said pair of discriminating means for each connection, one or the other of said discriminating means being operable in response to the change in phase of the outputs of said circuit means to control respectively the operation of one or the other of said relays, said time delay means causing one of said relays to remain operative as the other of said relays becomes operative on a change in phase of the output for each combination of said circuit means, and means controlled by the simultaneous operation of both of said relays each time the output of one of said combinations of said circuit means changes phase.

17. In a device of the class described, comprising in combination, circuit means having a plurality of combinations each of which has a separate output which varies in phase, relay means including a pair of relays each of which includes associated time delay means connected thereto, a pair of discriminating means connected respectively to said pair of relays, switching means sequentially connecting said circuit means to said pair of discriminating means in a plurality of different connections such that said plurality of combinations of said circuit means having different outputs are connected respectively to said pair of discriminating means for each connection, one or the other of said discriminating means being operable in response to the change in phase of the outputs of said circuit means to control respectively the operation of one or the other of said relays, said time delays means causing one of said relays to remain operative as the other of said relays becomes operative on a change in phase of the output for each combination of said circuit means, means controlled by the simultaneous operation of both of said relays each time the output of one of said combinations of said circuit means changes phase, and means controlled by said last-named means for indicating this change in phase in each of the outputs of said combinations of said circuit means.

ROMAN C. RUHLAND.

REFERENCES CITED

The following references are of record in the file of this patent:

UNITED STATES PATENTS

| Number | Name | Date |
|---|---|---|
| 1,291,351 | Alexander | Jan. 14, 1919 |
| 2,278,919 | Erickson et al. | Apr. 7, 1942 |
| 2,306,391 | Keinath | Dec. 29, 1942 |
| 2,340,880 | Keinath | Feb. 8, 1944 |
| 2,368,953 | Walsh | Feb. 6, 1945 |
| 2,387,760 | Keinath | Oct. 30, 1945 |
| 2,412,092 | Mayle | Dec. 3, 1946 |
| 2,437,242 | Cole et al. | Mar. 9, 1948 |
| 2,460,055 | Wilson et al. | Jan. 25, 1949 |